US010690470B2

(12) United States Patent
Squiers

(10) Patent No.: US 10,690,470 B2
(45) Date of Patent: *Jun. 23, 2020

(54) FOLDING RULER

(71) Applicant: Milwaukee Electric Tool Corporation, Brookfield, WI (US)

(72) Inventor: Grant T. Squiers, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,574

(22) Filed: Apr. 24, 2019

(65) Prior Publication Data

US 2019/0249973 A1 Aug. 15, 2019

Related U.S. Application Data

(63) Continuation of application No. 15/184,703, filed on Jun. 16, 2016, now Pat. No. 10,317,183.

(60) Provisional application No. 62/180,270, filed on Jun. 16, 2015.

(51) Int. Cl.
*G01B 3/06* (2006.01)
*G01B 3/56* (2006.01)

(52) U.S. Cl.
CPC .............. *G01B 3/06* (2013.01); *G01B 3/563* (2013.01)

(58) Field of Classification Search
CPC ........................................................ G01B 3/06
USPC ......................................................... 33/458
See application file for complete search history.

(56) References Cited

U.S. PATENT DOCUMENTS

| 691,728 A | 1/1902 | Norfolk |
| 716,150 A | 12/1902 | Traut et al. |
| 756,055 A | 3/1904 | Rhodes |
| 756,594 A | 4/1904 | Davis |
| 1,524,730 A | 2/1925 | Marshall |

(Continued)

FOREIGN PATENT DOCUMENTS

| DE | 4223747 | 1/1994 |
| EP | 0576429 | 4/1995 |

(Continued)

OTHER PUBLICATIONS

Packer, Improvised Protractor Formed by Combining Folding Rule with Inch Scale Popular Mechanics, Oct. 1949, vol. 92, No. 4, p. 223-224.

(Continued)

*Primary Examiner* — Christopher W Fulton
(74) *Attorney, Agent, or Firm* — Reinhart Boerner Van Deuren s.c.

(57) ABSTRACT

A foldable ruler includes a first ruler segment, a second ruler segment pivotally coupled to the first ruler segment, a third ruler segment pivotally coupled to the second ruler segment, and a fourth ruler segment pivotally coupled to the third ruler segment. Each of the first, second, third, and fourth ruler segments includes a first side surface and a second side surface opposite the first side surface. At least one of the first and second side surfaces includes a first set of indicia representing units of measurement. Each of the first, second, third, and fourth ruler segments also includes a top surface extending between the first and second side surfaces. The top surface of the fourth ruler segment includes a second set of indicia representing a plurality of angles.

20 Claims, 5 Drawing Sheets

(56) References Cited

U.S. PATENT DOCUMENTS

| | | | |
|---|---|---|---|
| 1,608,713 A | 11/1926 | Anderson | |
| 1,849,128 A | 3/1932 | Wood | |
| 1,907,459 A * | 5/1933 | Stowell | G01B 3/06 403/101 |
| 2,607,995 A * | 8/1952 | Butler | G01B 3/06 33/458 |
| 2,655,730 A * | 10/1953 | Proctor | G01B 3/06 403/97 |
| 2,663,940 A * | 12/1953 | Gasstrom | G01B 3/06 403/101 |
| 3,490,148 A | 1/1970 | Mathes | |
| 4,955,141 A | 9/1990 | Welch | |
| 6,954,110 B2 | 11/2005 | Shapiro | |
| D569,747 S | 5/2008 | Ross | |
| 8,782,914 B1 | 7/2014 | DeLuca | |
| 10,317,183 B2 * | 6/2019 | Squiers | G01B 3/563 |
| 2004/0006881 A1 | 1/2004 | Shapiro | |
| 2006/0168834 A1 | 8/2006 | Critelli | |
| 2010/0229411 A1 | 9/2010 | Lai | |
| 2013/0283626 A1 | 10/2013 | Jones | |
| 2015/0033569 A1 | 2/2015 | Neugaertner | |
| 2016/0025475 A1 | 1/2016 | Neugartner | |

FOREIGN PATENT DOCUMENTS

| | | |
|---|---|---|
| EP | 1923660 | 5/2008 |
| EP | 1965168 | 9/2008 |
| EP | 2083242 | 7/2009 |
| EP | 2216620 | 8/2010 |
| EP | 2677269 | 12/2013 |
| FR | 2342856 | 9/1977 |
| FR | 2581752 | 11/1986 |
| GB | 2293457 | 3/1996 |
| WO | WO9216816 | 10/1992 |

OTHER PUBLICATIONS

ADGA, "High Quality Folding Rulers", brochure, Available at least as early as May 26, 2015, 7 pages.

* cited by examiner

US 10,690,470 B2

FOLDING RULER

CROSS-REFERENCE TO RELATED APPLICATIONS

The present application is a continuation of U.S. application Ser. No. 15/184,703, filed Jun. 16, 2016, now U.S. Pat. No. 10,317,183, which claims priority to U.S. Provisional Patent Application No. 62/180,270, filed on Jun. 16, 2015, which are incorporated herein by reference in their entireties.

FIELD OF THE INVENTION

The present invention relates to rulers, and more particularly to folding rulers.

SUMMARY

In one aspect, a foldable ruler includes a first ruler segment, a second ruler segment pivotally coupled to the first ruler segment, a third ruler segment pivotally coupled to the second ruler segment, and a fourth ruler segment pivotally coupled to the third ruler segment. Each of the first, second, third, and fourth ruler segments includes a first side surface and a second side surface opposite the first side surface. At least one of the first and second side surfaces includes a first set of indicia representing units of measurement. Each of the first, second, third, and fourth ruler segments also includes a top surface extending between the first and second side surfaces. The top surface of the fourth ruler segment includes a second set of indicia representing a plurality of angles.

In another aspect, a foldable ruler includes a plurality of ruler segments pivotally coupled to each other. Each of the plurality of ruler segments includes a first side surface, a second side surface opposite the first side surface, and a top surface extending between the first and second side surfaces. The top surface of at least one of the plurality of ruler segments includes a set of indicia. The set of indicia corresponds to a plurality of angles between a first ruler segment and a longitudinal axis of an adjacent ruler segment.

In yet another aspect, a foldable ruler includes a plurality of ruler segments pivotally coupled to each other. Each of the plurality of ruler segments includes a first side surface, a second side surface opposite the first side surface, and a top surface extending between the first and second side surfaces. The top surface of at least one of the plurality of ruler segments includes a set of indicia representing a plurality of angles.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
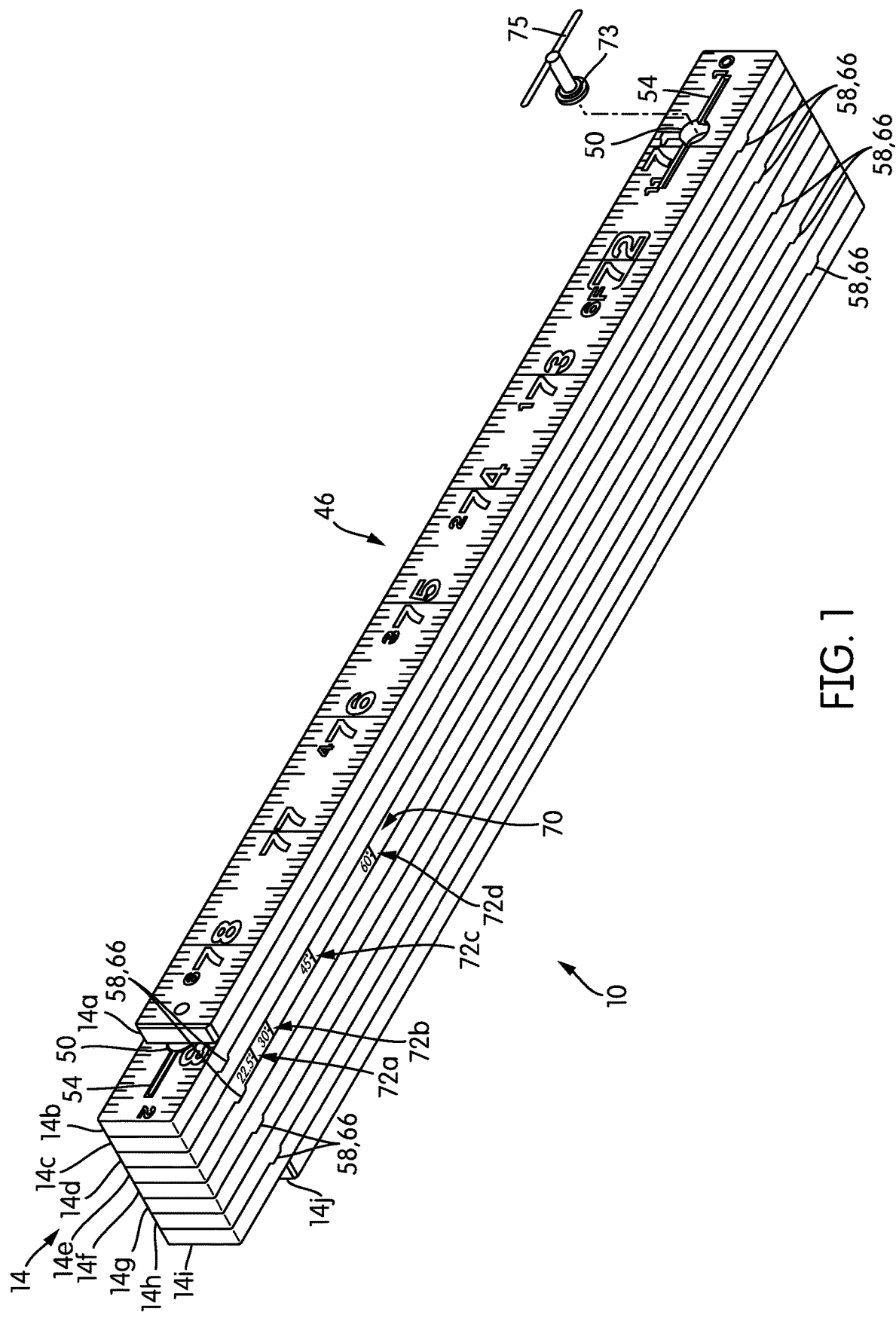
FIG. 1 is a perspective view of a folding ruler according to an embodiment of the invention.

FIG. 1 illustrates a folding ruler 10 including a plurality of ruler segments 14 pivotally coupled together. In the illustrated embodiment, the folding ruler 10 includes ten ruler segments and respective ruler segments are separately indicated, e.g., a first ruler segment 14a through a tenth ruler segment 14j. In other embodiments, the folding ruler 10 may include fewer or more than ten ruler segments. The illustrated ruler segments 14a, 14j—otherwise referenced as end ruler segments—are attached to one adjacent ruler segment, whereas the ruler segments 14b through 14i are attached to two adjacent ruler segments.

Figure 2:
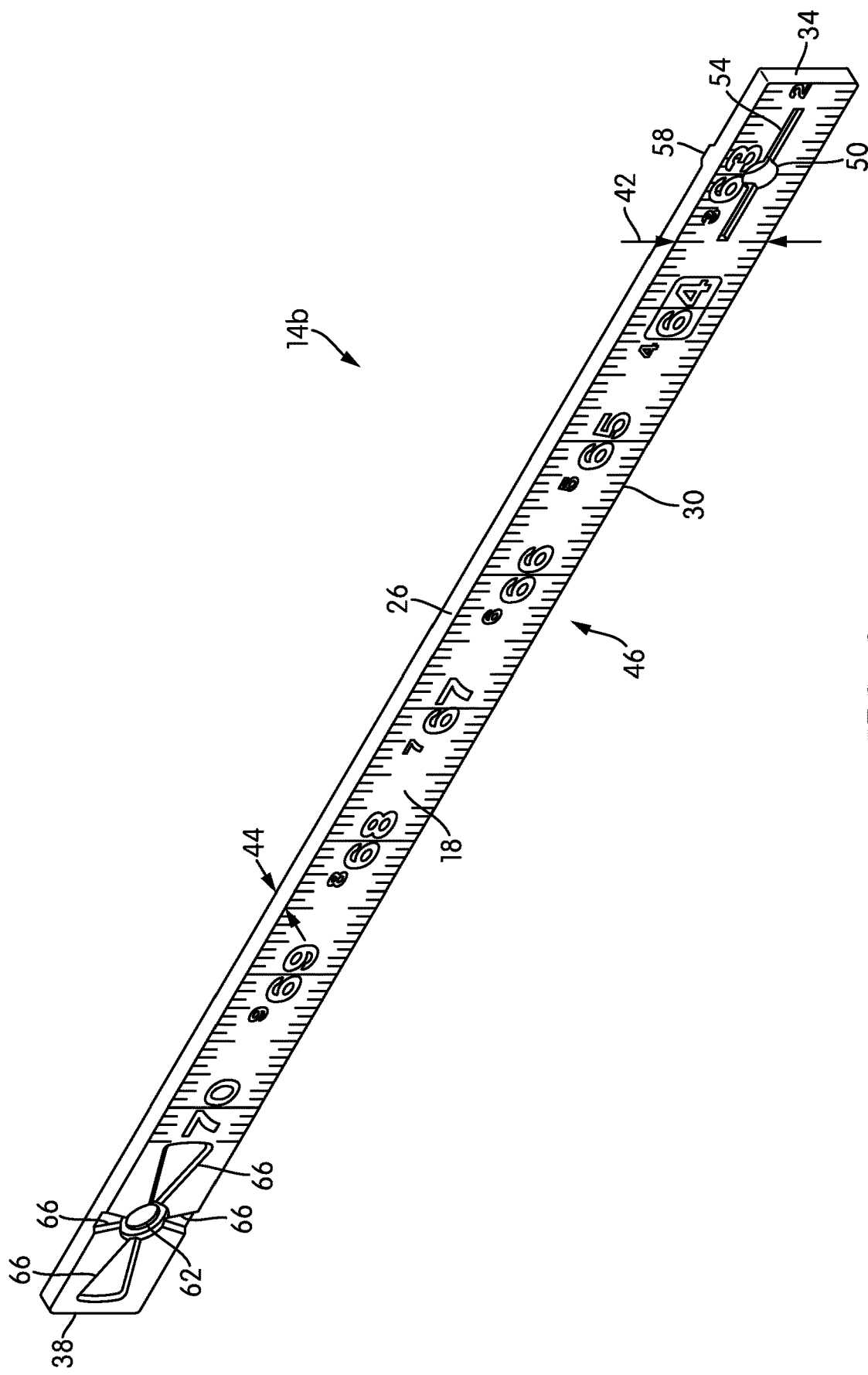
FIG. 2 is a left-side perspective view of a segment of the folding ruler.
Figure 3:
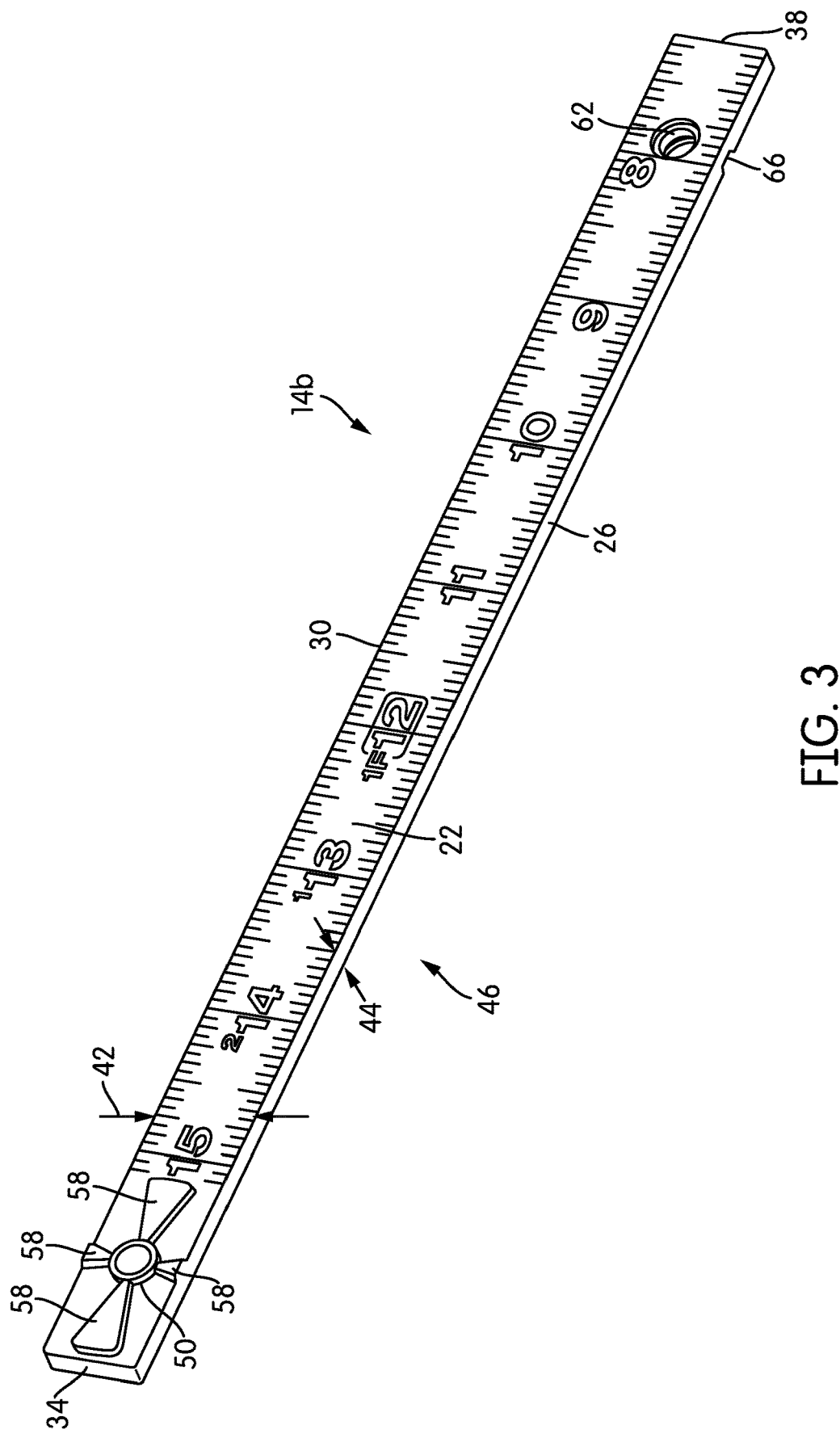
FIG. 3 is a right-side perspective view of the segment of FIG. 2.

With reference to FIGS. 2 and 3, the ruler segments 14a through 14j (although ruler segment 14b is only illustrated in FIGS. 2 and 3) each include a first side surface 18, a second side surface 22, a top surface 26, a bottom surface 30, a first end surface 34, and a second end surface 38. The illustrated first side surface 18 is opposite from the second side surface 22 and both include a side surface width 42 that is greater than a surface width 44 of the surfaces 26, 30, 34, 38. In addition, the first side and second side surfaces 18, 22 include a first set of indicia 46 representing units of measurement (e.g., units of length). The illustrated first set of indicia 46 includes an inch scale incrementing every whole number and having markings every $1/16^{th}$ of an inch between the whole numbers. Units of feet are also represented by whole numbers at the corresponding inch indicia. Each of the ruler segments 14a through 14j includes a unique sequence of indicia 46 configured to align in series to provide a measurement of length greater than a single ruler segment. For example, the folding ruler 10 can measure lengths up to 79 inches; however, in other embodiments, the folding ruler 10 may measure lengths less than or greater than 79 inches depending on the number and the lengths of the ruler segments 14. In other embodiments, the first set of indicia 46 may represent other units of length, e.g., meters, centimeters, etc. In further embodiments, the first set of indicia 46 may represent other units of measurement, e.g., tile gradations, brick mason layer measurements, circumference gradations, etc.

In continued reference to FIGS. 2 and 3, the ruler segments 14a through 14i include a first aperture 50, a slot 54, and protrusions 58 located adjacent the first end surface 34. The illustrated first aperture 50 extends from the first side surface 18 to the second side surface 22, the illustrated slot 54 is elongated and extends from the first side surface 18 partially towards the second side surface 22, and the illustrated protrusions 58 extend outwardly from the second side surface 22 and are substantially orientated at 90 degrees relative to each other. In addition, the protrusions 58 define wedged-shaped members increasing in dimension away from the first aperture 50.

Furthermore, the ruler segments 14b through 14j include a second aperture 62 and recessed portions 66 located adjacent the second end surface 38. The illustrated second aperture 62 is a double countersunk hole extending from the first side surface 18 to the second side surface 22. The illustrated recessed portions 66 are sized similar to the protrusions 58 such that the protrusions 58 of a ruler segment are configured to seat within the recessed portions 66 of another ruler segment.

Figure 4:
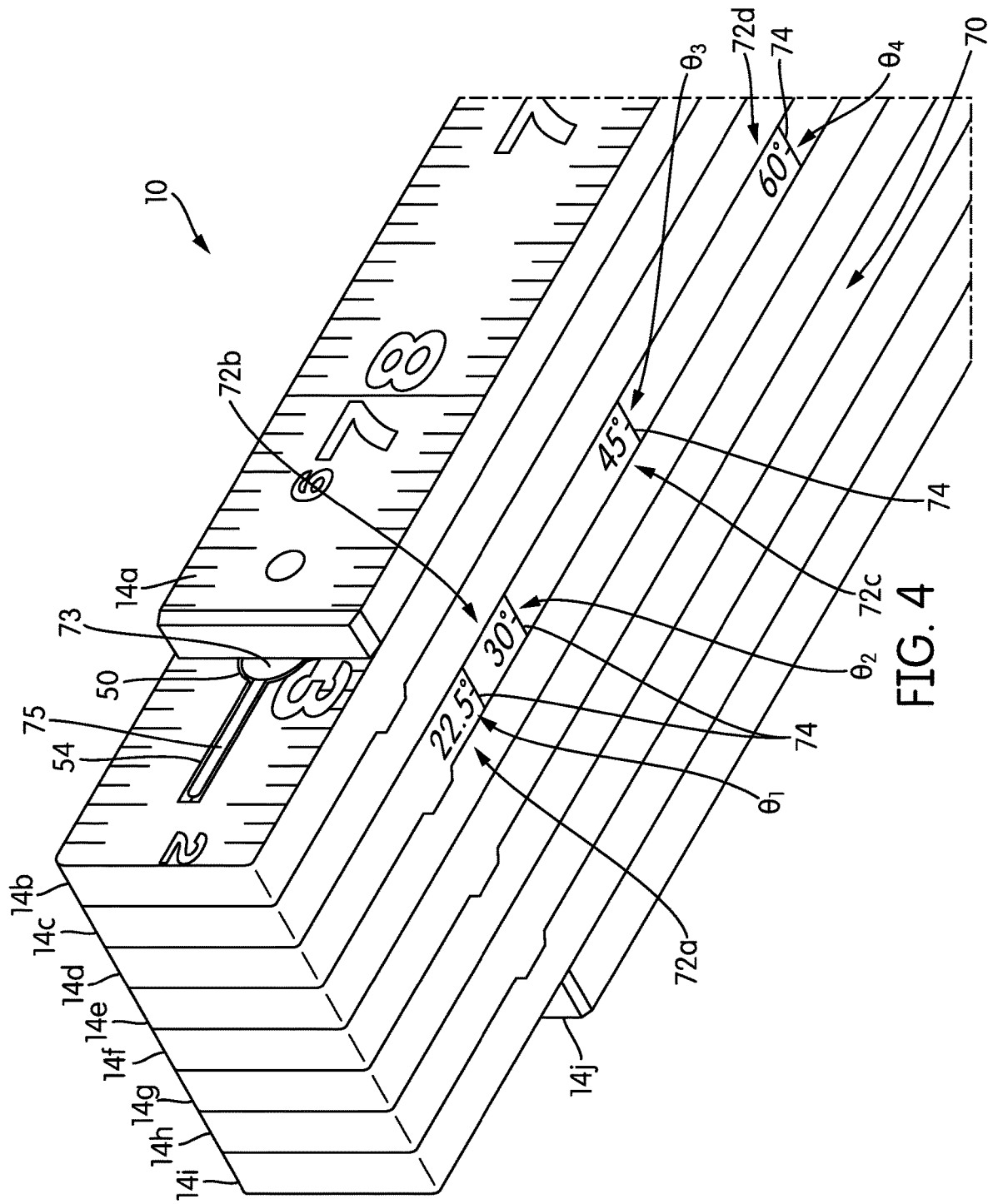
FIG. 4 is a detailed view of FIG. 1 illustrating a set of indicia representing a plurality of angles.

With reference to FIG. 4, a second set of indicia 70 is located on one of the top surface 26 or the bottom surface 30 of the fourth ruler segment 14d and includes angle markings 72a, 72b, 72c, 72d. In one embodiment, the second set of indicia 70 may be located on the top surface 26 and the bottom surface 30 of the fourth ruler segment 14d. In other embodiments, the indicia 70 may be located on other ruler segments, e.g., on the seventh ruler segment 14g. In further embodiments, the second set of indicia 70 may be located on at least one of the side surfaces 18, 22 of the fourth ruler segment 14d and/or the seventh ruler segment 14g. The illustrated angle markings 72a, 72b, 72c, 72d each include a line 74 extending between the side surfaces 18, 22 that is associated with an angle $\theta_1$, $\theta_2$, $\theta_3$, $\theta_4$. In particular, the line 74 associated with the first angle marking 72a represents a 22.5 degree marking, the line 74 associated with the second angle marking 72b represents a 30 degree marking, the line 74 associated with the third angle marking 72c represents a 45 degree marking, and the line 74 associated with the fourth angle marking 72d represents a 60 degree marking. In other embodiments, the angle markings 72a, 72b, 72c, 72d may include fewer or more than four markings and/or the angles $\theta_1$, $\theta_2$, $\theta_3$, $\theta_4$ represent different angles, e.g., 40 degree angle, 50 degree angle, etc.

The illustrated ruler segments 14a through 14j are assembled such that the protrusions 58 of a ruler segment align with the recessed portions 66 of an adjacent ruler segment. The ruler segments 14a through 14j are pivotally attached together utilizing a pin 73. For example, the pin 73 is received through and seated within the countersunk portion of the second aperture 62 of one ruler segment. In addition, the pin 73 is also received through the first aperture 50 of the adjacent ruler segment. The pin 73 is maintained within the apertures 50, 62 thereby coupling adjacent ruler segments together by a resilient locking rod 75, which is positioned within the slot 54 and received through the pin 73. The resilient locking rod 75 allows axial movement—perpendicular to the rotational movement—of adjacent ruler segments as the ruler segments pivot relative to each other. In particular, as the ruler segments 14a through 14j rotate relative to each other, the protrusions 58 temporarily disengage from the recessed portions 66 with the resilient locking rod 75 biasing the two adjacent ruler segments together for reengagement between the protrusions 58 and the recessed portions 66. As such, the resilient locking rod 75 enables one ruler segment to be held at any position-360 degrees-relative to another ruler segment.

Figure 5:
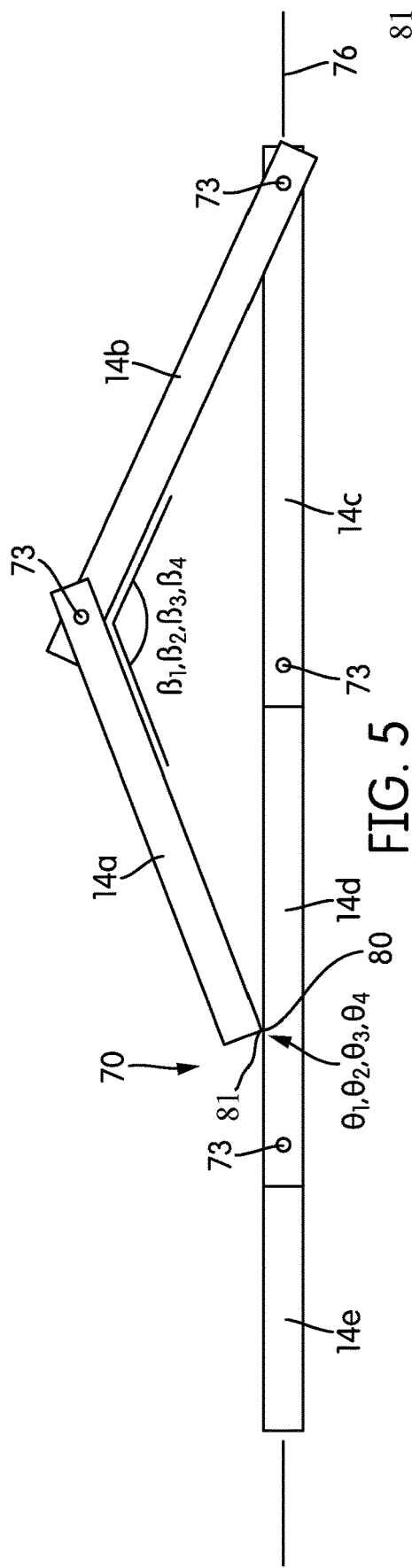
FIG. 5 illustrates the folding ruler in a first position with a first ruler segment aligned with one of the angle indicia of FIG. 4.
Figure 6:
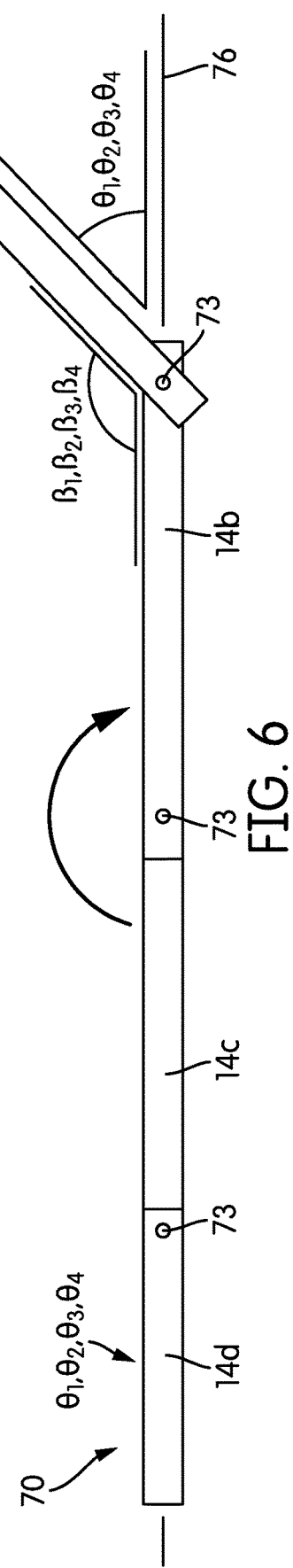
FIG. 6 illustrates the folding ruler in a second position with the one of the plurality of angles of FIG. 5 transposed between the first ruler segment and a longitudinal axis of an adjacent ruler segment.

The operation and method of utilizing the second set of indicia 70 is illustrated in FIGS. 5 and 6. In the illustrated embodiment, at least the third and fourth ruler segments 14c, 14d are pivoted relative to each other such that a longitudinal axis 76 extends through, e.g., co-axial with, the third and fourth segments 14c, 14d. The first and second ruler segments 14a, 14b are also pivoted relative to the third and fourth ruler segments 14c, 14d such that an edge 80 of the first ruler segment 14a aligns with one of the angle markings 72a, 72b, 72c, 72d. In other words, the edge 80 aligns with a desired angle $\theta_1$, $\theta_2$, $\theta_3$, $\theta_4$. In other embodiments, a marker, e.g., a pointer 81, may be included at the edge 80 for easy alignment with the desired angle $\theta_1$, $\theta_2$, $\theta_3$, $\theta_4$. As the edge 80 aligns with the desired angle $\theta_1$, $\theta_2$, $\theta_3$, $\theta_4$, supplementary angles $\beta_1$, $\beta_2$, $\beta_3$, $\beta_4$ with respect to the angles $\theta_1$, $\theta_2$, $\theta_3$, $\theta_4$ represent an angle between the first and second ruler segments 14a, 14b. For example, the first supplementary angle $\beta_1$ equals 180 degrees minus the first angle $\theta_1$.

With reference to FIG. 6, while maintaining the supplementary angle $\beta_1$, $\beta_2$, $\beta_3$, $\beta_4$ between the first and second ruler segments 14a, 14b fixed, the first and second ruler segments 14a, 14b co-rotate relative to the third and fourth ruler segments 14c, 14d until the second ruler segment 14b is co-axial with the longitudinal axis 76. As such, the desired angle $\theta_1$, $\theta_2$, $\theta_3$, $\theta_4$ indicated on the fourth ruler segment 14d is transposed between the first ruler segment 14a and the longitudinal axis 76 of at least the second ruler segment 14b.

Although the invention has been described in detail with reference to certain preferred embodiments, variations and modifications exist within the scope and spirit of one or more independent aspects of the invention as described.

What is claimed is:

1. A foldable ruler comprising:
   four or more pivotably coupled ruler segments, each ruler segment comprising a first side surface, a second side surface opposite the first side surface, a top surface extending between the first side surface and the second side surface, a bottom surface extending between the first side surface and the second side surface opposite the top surface;
   a first set of indicia indicating units of measurement, wherein the first set of indicia is located on at least one of the first side surface and the second side surface of the four or more pivotably coupled ruler segments; and
   a second set of indicia on the top surface of a fourth ruler segment, the second set of indicia comprising lines indicating numerical angle markings, and wherein the second set of indicia indicates an angle formed between a first ruler segment and a longitudinal axis of a second ruler segment.

2. The foldable ruler of claim 1, wherein the second set of indicia further comprises a first numerical angle marking comprising a 22.5 degree marking, a second numerical angle marking comprising a 30 degree marking, a third numerical angle marking comprising a 45 degree marking, and a fourth numerical angle marking comprising a 60 degree marking, wherein each of the first angle marking, the second angle marking, the third angle marking, and the fourth angle marking are located on the fourth ruler segment and measure the angle formed between the first ruler segment and the longitudinal axis of the second ruler segment when the second ruler segment is pivoted about a third ruler segment until an edge of the first ruler segment touches the top surface of the fourth ruler segment, when the third ruler segment and the fourth ruler segment are collinear.

3. The foldable ruler of claim 1, wherein the first set of indicia indicates units of length and wherein the second set of indicia is located on the top surface and the bottom surface of the fourth ruler segment.

4. The foldable ruler of claim 1, wherein the first set of indicia indicates units of length and wherein the second set of indicia is located on the top surface and at least one of the first side surface or the second side surface of the fourth ruler segment.

5. The foldable ruler of claim 1, wherein the four or more segments align in series to measure lengths equal to or greater than 79 inches.

6. The foldable ruler of claim 1, wherein an edge of the first ruler segment aligns with a line on the top surface of the fourth ruler segment to indicate the angle formed between the first ruler segment and the longitudinal axis of the second ruler segment, when the second ruler segment is rotated about a third ruler segment that is collinear with the fourth ruler segment.

7. The foldable ruler of claim 1, wherein an edge of the first ruler segment aligns with a line on the top surface of the fourth ruler segment indicating the angle between the first ruler segment, and wherein the second set of indicia indicates a supplementary angle opposite the angle between the first ruler segment and the second ruler segment.

8. The foldable ruler of claim 7, further comprising a marker at the edge of the first ruler segment, the marker configured to align with the second set of indicia.

9. The foldable ruler of claim 1, further comprising a first aperture, a slot, and four protrusions on a first end of each of the four or more ruler segments, wherein the first aperture extends from the first side surface to the second side surface of each of the ruler segments, wherein the slot is elongated and extends from the first side surface partially towards the second side surface, and wherein the four protrusions are oriented at 90 degrees relative to each other on the first side surface and define wedge-shaped members that increase in dimension as the four protrusions extend outwardly from the first aperture.

10. The foldable ruler or claim 9, further comprising a second aperture and four recessed portions located on a second end opposite the first end of each of the four or more ruler segments, wherein the second aperture is a double countersunk hole extending from the first side surface to the second side surface of each of the four or more ruler segments, and wherein the four recessed portions are oriented at 90 degrees relative to each other on the second side surface and define wedge-shaped members that increase in dimension as the recessed portions extend outwardly from the second aperture.

11. A foldable ruler comprising:
a first ruler segment comprising an edge at an unattached end of the first ruler segment;
a second ruler segment pivotably coupled to the first ruler segment;
a third ruler segment pivotably coupled to the second ruler segment;
a fourth ruler segment pivotably coupled to the third ruler segment;
each ruler segment comprising:
a first side surface;
a second side surface opposite the first side surface;
a top surface extending between the first side surface and the second side surface;
a bottom surface extending between the first side surface and the second side surface opposite the top surface;
a first end comprising:
a first aperture extending from the first side surface to the second side surface;
an elongated slot that partially extends through each ruler segment from the first side surface towards the second side surface; and
four protrusions oriented at 90 degrees relative to each other on the first side surface, the four protrusions each defining wedge-shaped members that increase in dimension as the four protrusions extend outwardly on the first side surface and away from the first aperture;
a first pin extending through the first aperture and configured to secure the ruler segment to an adjacent ruler segment;
a resilient locking rod coupled to the first pin, the resilient locking rod being secured in the elongated slot on the first side surface; and
a second end opposite the first end, the second end comprising:
a second aperture that is a double countersunk hole and extends from the first side surface to the second side surface;
a second pin extending through the second aperture and configured to secure the ruler segment to the adjacent ruler segment when seated within the double countersunk hole; and
four recessed portions oriented at 90 degrees relative to each other, each recessed portion defining wedge-shaped members that increase in dimension as the four recessed portions extend outwardly from the second aperture; and
a first set of indicia indicating units of length measurement, the first set of indicia being located on at least one of the first side surface and the second side surface of each ruler segment; and
a second set of indicia on the top surface of the fourth ruler segment, the second set of indicia comprising a line indicating a plurality of numerical angle markings, wherein the second set of indicia indicates an angle between the first ruler segment and a longitudinal axis of the second ruler segment.

12. The foldable ruler of claim 11, wherein the second set of indicia further comprises:
a first numerical angle marking comprising a 22.5 degree marking;
a second numerical angle marking comprising a 30 degree marking;
a third numerical angle marking comprising a 40 degree marking;
a fourth numerical angle marking comprising a 45 degree marking;
a fifth numerical angle marking comprising a 50 degree marking; and
a sixth numerical angle marking comprising a 60 degree marking;
wherein each of the first angle marking, the second angle marking, the third angle marking, the fourth angle marking, the fifth angle marking, and the sixth angle marking are located on the fourth ruler segment and indicate the angle formed between the first ruler segment and the longitudinal axis of the second ruler segment when the second ruler segment is pivoted about the third ruler segment.

13. The foldable ruler of claim 11, wherein four or more segments align in series to measure lengths equal to or greater than 79 inches.

14. The foldable ruler of claim 11, further comprising a pointer at the edge of the first ruler segment, the pointer configured to align with the second set of indicia to indicate the angle formed between the first ruler segment and the second ruler segment when the second ruler segment is rotated about the third ruler segment and the third ruler segment and the fourth ruler segment are collinear.

15. The foldable ruler of claim 11, wherein a first distance between the top surface and bottom surface of each ruler segment defines a side surface width, and wherein a second distance between the first side surface and the second side surface of each ruler segment defines a top surface width, and wherein the side surface width is greater than the top surface width.

16. The foldable ruler of claim 11, wherein the resilient locking rod further comprises a biasing member configured to hold adjacent ruler segments in any rotated position about the first pin.

17. The foldable ruler of claim 11, wherein the first set of indicia comprises an inch scale incrementing each whole number and having markings every $\frac{1}{16}^{th}$ of an inch between whole numbers and corresponding units of feet incrementing in whole numbers every 12 inches, the first set of indicia further comprising a meter scale with markings every centimeter.

18. The foldable ruler of claim 15, wherein the first set of indicia further comprises at least one of a tile gradation, a brick mason layer gradation, or a circumference gradation.

19. A foldable ruler comprising:
  a first ruler segment;
  a second ruler segment pivotally coupled to the first ruler segment;
  a third ruler segment pivotally coupled to the second ruler segment; and
  a fourth ruler segment pivotally coupled to the third ruler segment;
  a first set of indicia representing units of measurement; and
  a second set of indicia comprising a plurality of numerical angle markings and a line associated with each of the numerical angle markings;
  wherein each of the first, second, third, and fourth ruler segments includes a first side surface, a second side surface opposite the first side surface, wherein the first set of indicia is located on at least one of the first and second side surfaces; and
  wherein each of the first, second, third, and fourth ruler segments also includes a top surface extending between the first and second side surfaces, wherein the numerical angle markings are located on the top surface of the fourth ruler segment.

20. The foldable ruler of claim 19, wherein a portion of the first ruler segment is alignable with a first numerical angle marking of the second set of indicia so that the first numerical angle marking corresponds to an angle between the first ruler segment and a longitudinal axis of the second ruler segment.

* * * * *